United States Patent [19]

Rosen

[11] Patent Number: 5,309,508
[45] Date of Patent: May 3, 1994

[54] APPARATUS AND METHOD FOR AUTOMATICALLY BLOCKING THE TRANSMISSION OF IDENTIFYING INFORMATION CONCERNING A TELEPHONE CALLING PARTY

[76] Inventor: Howard Rosen, 1 Lyncroft Road, Montreal, Quebec, Canada, H3X 3E3

[21] Appl. No.: 948,595

[22] Filed: Sep. 23, 1992

[51] Int. Cl.$^5$ .............. H04M 1/56; H04M 3/42; H04M 5/00; H04M 1/00
[52] U.S. Cl. .................... 379/142; 379/216; 379/245; 379/246; 379/354; 379/355
[58] Field of Search ............ 379/67, 142, 216, 245, 379/246, 354, 355

[56] References Cited

U.S. PATENT DOCUMENTS

| | | | |
|---|---|---|---|
| 4,847,890 | 7/1989 | Solomon et al. | 379/67 |
| 4,910,767 | 3/1990 | Brugliera et al. | 379/355 |
| 4,926,471 | 5/1990 | Ikeda | 379/142 |
| 5,031,212 | 7/1991 | Saji et al. | 379/355 |
| 5,033,076 | 7/1991 | Jones et al. | 379/142 |
| 5,058,152 | 10/1991 | Soloman et al. | 379/67 |
| 5,161,181 | 11/1992 | Zwick | 379/142 |

*Primary Examiner*—Stephen Chin
*Assistant Examiner*—Vijay Shankar
*Attorney, Agent, or Firm*—Oblon, Spivak, McClelland, Maier & Neustadt

[57] ABSTRACT

An off-hook condition on the telephone line of the calling party is detected. When the off-hook condition is detected, an automatic dialer is initiated to dial a predetermined code which, when received by computers of the telephone company, will automatically block the transmission of information which identifies the calling party, and more specifically, the telephone number of the calling party.

7 Claims, 2 Drawing Sheets

APPARATUS AND METHOD FOR AUTOMATICALLY BLOCKING THE TRANSMISSION OF IDENTIFYING INFORMATION CONCERNING A TELEPHONE CALLING PARTY

BACKGROUND OF THE INVENTION

1. Field of the Invention

The invention relates to a method for blocking the transmission of identifying information of a calling party on a telephone network. The invention also relates to an apparatus for carrying out the method. 2. Description of Prior Art Telephone companies presently provide Caller ID service whereby to identify, to a party receiving a telephone call, the telephone number of the calling party. With this service, the telephone number of the calling party is transmitted, along with the ringing signal and, if the receiving party has a special receiving device for this purpose, the number of the calling party will be displayed on this special device.

There are times when it is inconvenient to a calling party to have his phone number disclosed to the receiving party. For example, the calling party may be calling from an unlisted telephone number which he does not wish to disclose to the receiving party. For this reason, the telephone companies providing the above services have received complaints and they therefore now provide a further service whereby, on action of the calling party, the transmission of the identifying information will be blocked.

This action, which can be taken by any telephone subscriber, consists of first registering with the telephone company. Thereafter, before dialing any telephone number, the caller would dial a predetermined code, for example, *67.

The predetermined code is transmitted to a computer of the telephone company which then blocks the transmission of the identifying information.

One of the problems with this solution is that it is inconvenient to continually dial the predetermined code before dialing any telephone number. In addition, it is possible that a calling party will forget to dial the predetermined code whereupon his telephone number will be transmitted.

SUMMARY OF INVENTION

It is therefore an object of the invention to provide a device which eliminates the necessity for the calling party to dial the predetermined code.

It is also an object of the invention to provide a method which eliminates the necessity for the calling party to dial the predetermined code.

It is a more specific object of the invention to provide an apparatus which automatically dials the predetermined code before the calling party dials the telephone number of the receiving party.

It is a further object of the invention to provide a method wherein the predetermined code is automatically dialed before the calling party dials the telephone number of the receiving party.

In accordance with the broad principles of the invention, the apparatus includes a means for detecting an off-hook condition and, upon detection of the off-hook condition, initiates an automatic dialer which automatically dials the predetermined code.

Also, in accordance with the broad principles of the invention, an off-hook detector detects an off-hook condition and, upon detection of the off-hook condition, initiates an automatic dialer to automatically dial the predetermined code before the calling party dials the telephone number of the receiving party.

In accordance with a particular embodiment of the invention there is provided a method for blocking the transmission of identifying information of a calling party on a telephone network, comprising:

providing an off-hook detector means for detecting an off-hook condition on the telephone line of said calling party;

said off-hook detector means providing an initiating signal on detecting said off-hook condition;

applying said initiating signal to an automatic dialer means;

wherein, upon receipt of said initiating signal from said off-hook detector means, said automatic dialing means dials a predetermined code and applies it to said telephone line of said calling party;

in order to thereby block the transmission of identifying information concerning said calling party.

In accordance with a further particular embodiment of the invention there is provided an apparatus for blocking the transmission of identifying information of a calling party on a telephone network, comprising:

off-hook detector means having an input and an output, said input of said off-hook detector means being connected to the telephone line of said calling party to detect an off-hook condition on said telephone line of said calling party and to provide an initiating signal on detection of said off-hook condition;

automatic dialer means having an input and an output, said automatic dialing means input being connected to said off-hook detector means output and said automatic dialing means output being connected to said telephone line of said calling party;

wherein, upon receipt of said initiating signal from said off-hook detector means, said automatic dialing means dials a predetermined code and applies it to said telephone line of said calling party;

in order to thereby block the transmission of identifying information concerning said calling party.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
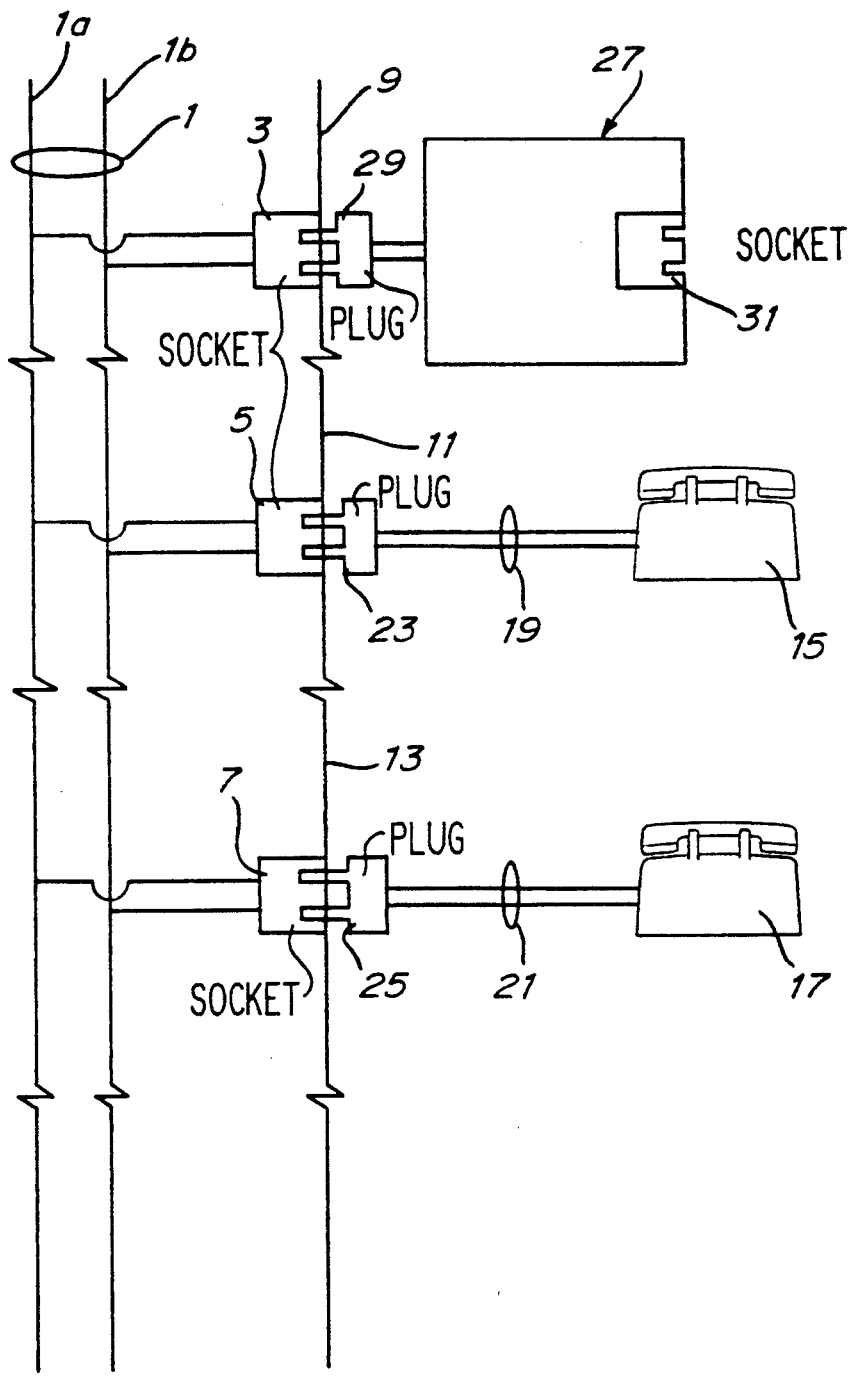
FIG. 1 illustrates a telephone arrangement in which the inventive apparatus is connected.

Referring to FIG. 1, a telephone line 1, consisting of wires 1a and 1b, is connected to a plurality of sockets 3, 5 and 7, mounted on walls 9, 11 and 13 respectively in a household. Telephones 15 and 17 are connected, via lines 19 and 21 respectively, to plugs 23 and 25 respectively which are plugged into sockets 5 and 7 respectively whereupon the telephones 15 and 17 are connected to the telephone line 1. Although FIG. 1 illustrates a situation in which a single line services a plurality of telephones, the invention is equally applicable when the telephone line services only a single telephone as will be discussed below.

The apparatus in accordance with the invention is illustrated generally at 27 in FIG. 1 and includes a plug 29, which mates with the socket 3, as well as a socket 31 which is similar to the socket 3.

Figure 2:
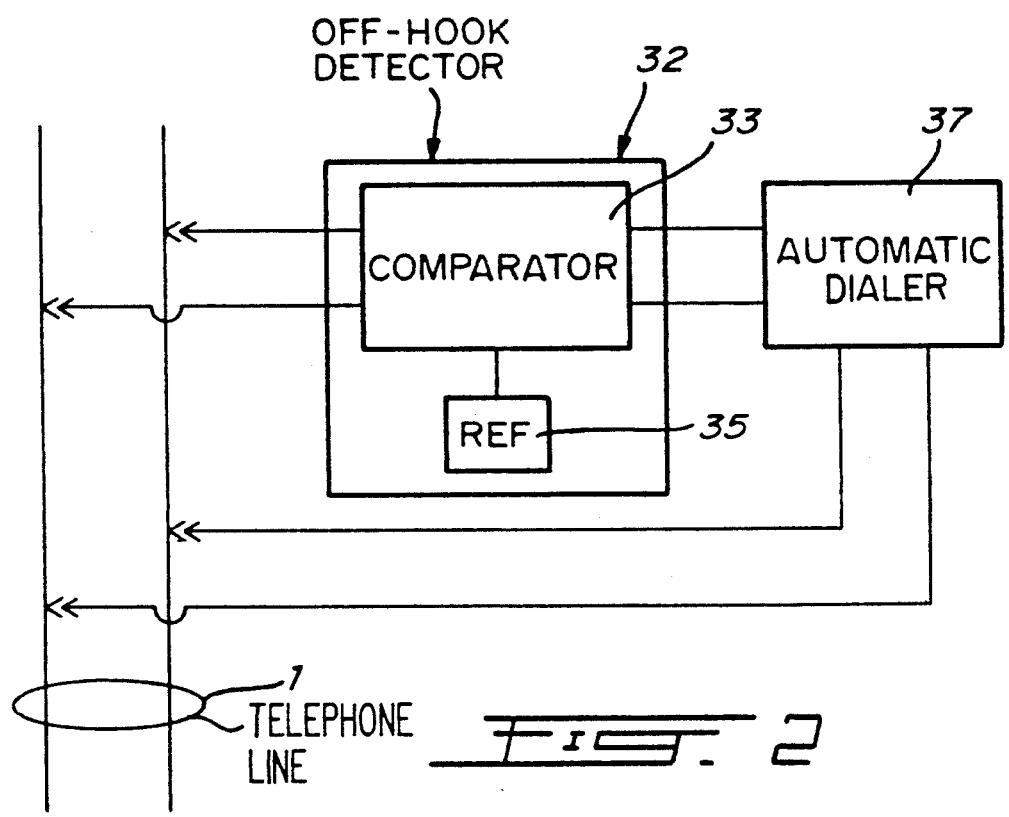
FIG. 2 is a schematic blocked diagram of the inventive apparatus.

In FIG. 2 the apparatus comprises an off-hook detector 32 which, in one embodiment, can comprise a voltage comparator 33 having an input terminal and a reference input which is fed with a reference voltage 35. As is known, when the line changes from an on-hook to an off-hook condition, there is a change in voltage—usually a decrease in voltage, across the line. This change is detected by comparator 33 which compares the voltage on the line with a reference voltage. Other arrangements could be used to detect the off-hook condition as well known in the art.

The output of the off-hook detector 32 is fed to an automatic dialer. When an off-hook condition is detected by the off-hook detector, an initiating signal is transmitted to the automatic dialer whereupon the automatic dialer will dial the predetermined code to block the transmission of the identifying information of the calling party. This predetermined code is applied to the telephone line 1.

The automatic dialer dials at a high enough speed so that the action of the apparatus 27 (FIG. 1) is essentially transparent to the calling party. Accordingly, the predetermined code is automatically dialed each time the receiver of the telephone is lifted to place the telephone line in an off-hook condition. Thus, the calling party does not have to go through the inconvenience of dialing the predetermined code each time, nor is it possible for the calling party to dial the number and forget to predial the predetermined code.

Returning to FIG. 1, when the telephone line is servicing only a single telephone, then that telephone would be plugged into socket 31 of the apparatus 27. In fact, this would be possible even when the line 1 is servicing a plurality of telephone lines. This eliminates the possibility that a socket will have to be used solely for the apparatus 27. That is, in accordance with the invention, both the inventive apparatus 27 and a telephone can be plugged into the same socket 3.

In the illustrated embodiment, the apparatus 27 has been described as a separate unit. It is also within the scope of the invention to incorporate the elements of device 27 in the telephone instrument (15 or 17) so that it forms a part of the instrument.

The inventive apparatus could, of course, be used to block other information of the calling party than the telephone number of the calling party.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A method for blocking the transmission of identifying information of a calling party on a telephone network, comprising;

detecting an off-hook condition on the telephone line of said calling party;

providing an initiating signal on detecting said off-hook condition;

said initiating signal causing automatic dialing of a predetermined code, said dialed predetermined code being applied to said telephone line of said calling party to thereby block the transmission of identifying information concerning said calling party;

said predetermined code being automatically dialed before the calling party dials the telephone number of a receiving party;

said predetermined code being transmitted to a computer of the telephone company which then blocks the transmission of the identifying information;

the speed of the automatic dialer being high enough so that the action of the automatic dialer is essentially transparent to said calling party;

said predetermined code being automatically dialed each time said off-hook condition is detected on the telephone line of said calling party.

2. A method as defined in claim 1 wherein the identifying information comprises the telephone number of the calling party.

3. A method as defined in claim 1 wherein the off-hook condition is detected by detecting a change in voltage on the telephone line.

4. A method as defined in claim 1 wherein the off-hook condition is detected by detecting a drop in voltage on the telephone line.

5. Apparatus for blocking the transmission of identifying information of a calling party on a telephone network, comprising;

off-hook detector means having an input and an output, said input of said off-hook detector means being connected to the telephone line of said calling party to detect an off-hook condition on said telephone line of said calling party and to provide and initiating signal on detection of said off-hook condition;

automatic dialing means having an input and an output, said automatic dialing means input being connected to said off-hook detector means output and said automatic dialing means output being connected to said telephone line of said calling party;

so that, upon receipt of said initiating signal from said off-hook detector means, said automatic dialing means dials a predetermined code and applies it to said telephone line of said calling party to thereby block the transmission of identifying information concerning said calling party;

said predetermined code being automatically dialed before the calling party dials the telephone number of a receiving party;

said predetermined code being transmitted to a computer of the telephone company which then blocks the transmission of the identifying information;

the speed of the automatic dialer being high enough so that the action of the automatic dialer is essentially transparent to said calling party;

said predetermined code being automatically dialed each time said off-hook condition is detected on the telephone line of said calling party.

6. Apparatus as defined in claim 5 wherein said off-hook detector means comprises a means for detecting a change in voltage across the telephone line.

7. Apparatus as defined in claim 5 wherein said off-hook detector means comprises a means for detecting a drop in voltage across the voltage line.

* * * * *